United States Patent Office 2,975,811
Patented Mar. 21, 1961

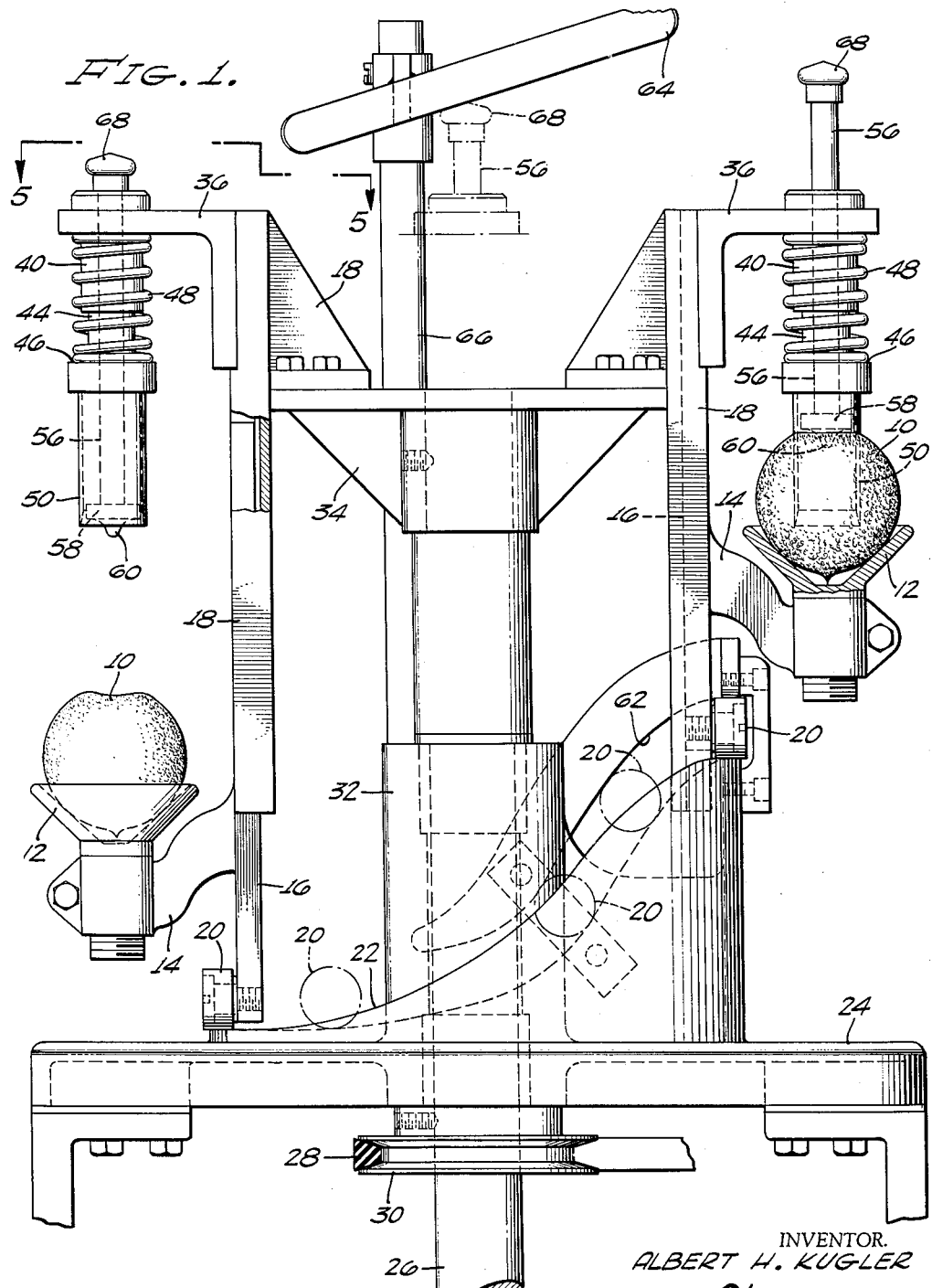

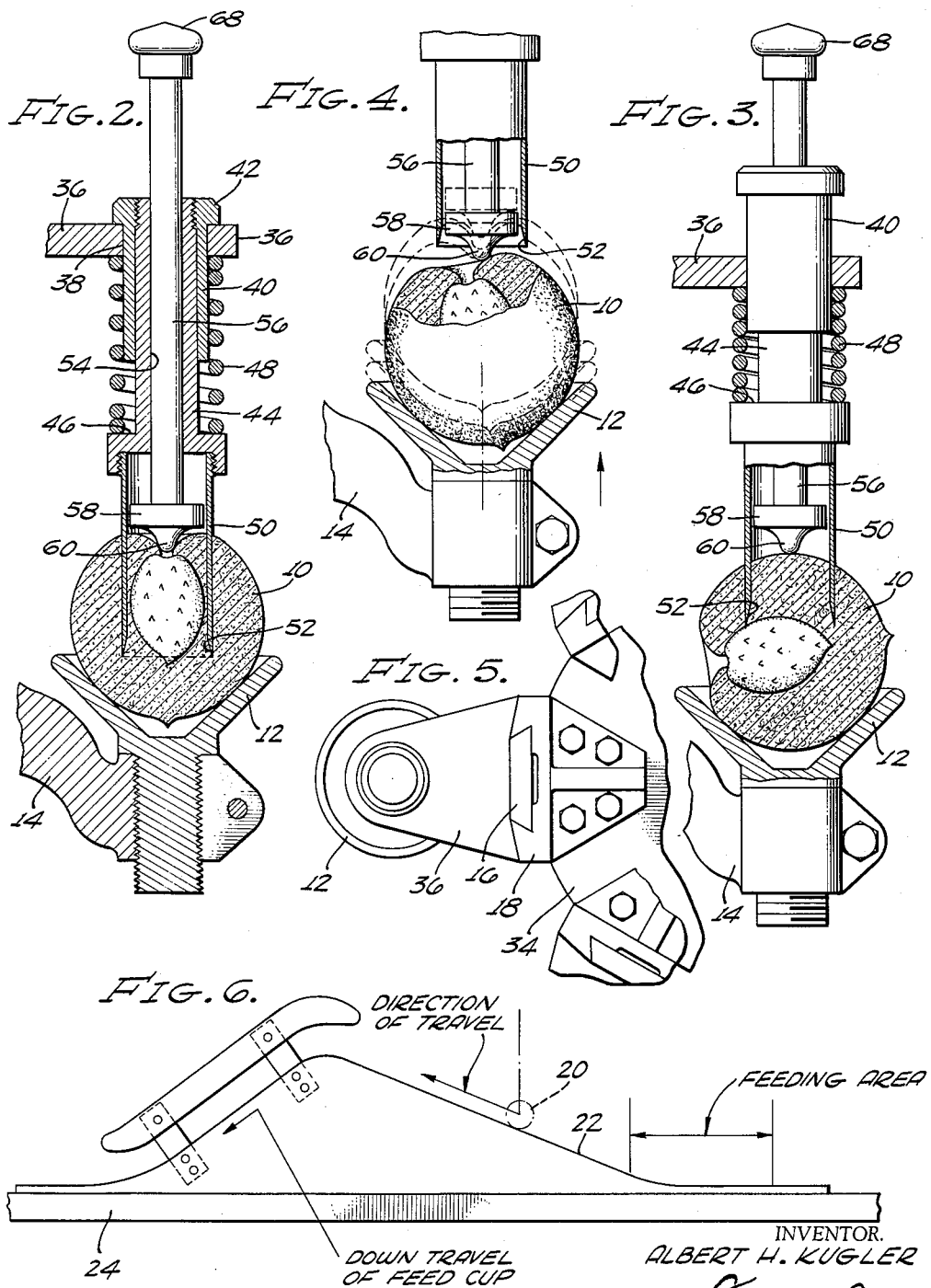

2,975,811
PEACH SPOONER

Albert H. Kugler, Oakland, Calif., assignor to California Packing Corporation, San Francisco, Calif., a corporation of California Filed Feb. 4, 1957, Ser. No. 638,014

9 Claims. (Cl. 146—28)

This invention relates to an improved peach spooner.

It is an object of this invention to make a cut of limited depth around the pit of a peach or similar fruit adequate to loosen but not remove the pit. Such a cut permits easy removal of the pit by the customer as well as spice penetration into the fruit when canned.

It is a further object of this invention to provide novel means for centering the peach during this spooning process.

It is still a further object of this invention to provide means for avoiding chopping off small bits of the pit in the event the fruit is not properly aligned.

It is still a further object of this invention to provide a machine having a smooth continuous operation which can handle a maximum input of peaches.

It is still a further object of this invention to provide novel means for ejecting spooned peaches from the machine.

Other objects and advantages will be readily apparent from the following description:

In the drawings:

Figure 1 is a side elevation of a peach spooner embodying this invention.

Figure 2 is a fragmentary view in section of the spooning mechanism with the fruit properly aligned.

Figure 3 is a view similar to Figure 2 with the fruit misaligned.

Figure 4 is a diagrammatic view of the fruit centering operation.

Figure 5 is a view taken along line 5—5 of Figure 1.

Figure 6 is a diagrammatic view of the operating cam.

A fruit to be spooned such as a peach or other drupe fruit is designated 10 and is placed by hand in cup 12 with the stem indent up. The cup is mounted upon an arm 14 in turn supported upon slide arm 16. The arm 16 slides vertically in bracket 18 and has a cam follower 20 on its lower extremity resting on cam 22. The cam is stationary on table 24, while bracket 18 rotates by means of shaft 26 driven from a suitable power source by belt 28 on pulley 30.

The shaft 26 is rotatably mounted in suitable bearings 32 and projects through table 24 and has mounted thereon a second bracket 34 from which bracket 18 is supported. While only one of the spooning assemblies is described in detail a plurality of same may be mounted on shaft 26 and the Figure 1 illustrates a pair of same.

As shaft 26 rotates carrying cup 12 therewith cam follower 20 follows cam 22 and is raised as slide arm 16 is telescopically received in bracket 18.

Positioned on bracket 18 is a third bracket 36 having a bore 38 therethrough which receives a sleeve 40 having a shoulder 42 thereon which contacts bracket 36. Positioned within sleeve 40 and threadably connected thereto is the coring knife support rod 44, which has a shoulder 46 formed thereon. A spring 48 is coiled around sleeve 40, one end of which bears against bracket 36 and the other against shoulder 46 permitting movement of the sleeve 40 and support rod 44 in bracket 36, while urging same downwardly as seen in Figure 2.

Threaded into the enlarged shoulder forming lower extremity of rod 44 is a cylindrical coring knife 50. This knife is hollow and has the lower inner surface beveled as at 52, permitting the knife to enter a properly positioned fruit and cut around the pit, the inner diameter being larger than that of a peach pit.

Thus when the peach is raised by the action of the cam follower 20 on inclined cam 22, it contacts the coring knife which cuts into the peach. If the peach is improperly positioned as illustrated by way of example in Figure 3, the coring knife contacts the pit and spring 48 is compressed thereby avoiding breaking of the knife or chipping the pit.

The support rod 44 has a bore 54 therethrough which receives the fruit centering device 56 which is free to move by gravity along the axis of travel of the peach. At the lower extremity of the centering device is formed a head 58 having an external diameter slightly smaller than the inner diameter of the coring knife 50 to be freely reciprocal therein. The underside of head 58 has a projection 60 formed thereon which is shaped approximately the same as the shape of the stem indent of an average size peach.

As diagrammatically illustrated in Figure 4, as the cup 12 rises under the action of cam 22 the projection 60 rests under gravity on the peach. If the operator has placed the peach in cup 12 in such a position that the projection 60 enters the stem indent of the fruit, further rising of the fruit causes same to shift its position in the cup to align with projection 60. The centering device 56 has sufficient mass to accomplish the alignment even with the indent twenty or thirty degrees off as long as the projection 60 enters the stem indent.

After the cam follower 20 passes the high point on cam 22 and hence the point of maximum penetration of knife 50 into peach 10, the cam declines as shown in Figure 6 moving the cup away from the peach which remains impaled on the coring knife. To insure withdrawal of the cup a control cam 62 is spaced above the descending portion of cam 22 having a complementary contour so that the follower 20 passes between cams 62 and 22 assuring its descent.

As the coring knife is rotated after the high point of cam 22 a stationary cam 64 is positioned upon a stationary part of the machine, for example post 66 rising from table 24 in the path of centering device 56. The centering device has a knob 68 which engages cam 64 and urges the centering member downwardly forcing the fruit off the coring knife into a suitable receptacle or chute, not shown.

Thus in operation a peach is placed stem indent up in cup 12. The cup rises as follower 20 follows the contour of cam 22 upon rotation of the cup. The peach contacts the projection 60 on the centering device prior to contacting the coring knife and if the projection 60 enters the stem indent the fruit is properly aligned with respect to the coring knife as it further rises shifting position in cup 12 if necessary. Upon further rotation the coring knife cuts into the fruit surrounding the pit, if properly aligned, or the spring 48 is compressed if the knife strikes the pit. The cup 12 is then withdrawn and the fruit ejected from the coring knife by knob 68 striking cam 64 depressing the centering device.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:
1. A spooning device for drupe fruit and the like comprising: fruit supporting means; vertically aligned coring knife means, said knife means being movably mounted in a suitable support and being resiliently urged downwardly toward said fruit supporting means by a spring between said knife supporting means and said knife means, aligning means within said knife means having a terminal portion extending below said knife means, said aligning means being free for vertical movement within said knife means; and ejecting means operatively associated with said aligning means for causing removal of a drupe fruit from said knife means.

2. A spooning device for drupe fruit and the like as defined in claim 1 in which said aligning means is movable solely by gravity, having sufficient mass to effect proper final alignment of said fruit so long as the fruit is in any position permitting said aligning device to enter the stem indent.

3. A spooning device for drupe fruit and the like as defined in claim 1, in which the coring knife means is cylindrical, having an inner diameter greater than the diameter of the fruit pit, and the aligning means having the fruit engaging extremity thereof shaped to conform substantially with the stem indent of said fruit.

4. A spooning device for drupe fruit and the like as defined in claim 1, in which said ejecting means comprises a cam periodically engaging said aligning device means.

5. A spooning device for drupe fruit and the like as defined in claim 1, in which the coring knife means is cylindrical, having a cutting edge thereof of greater size than the pit of the fruit and the inner surface thereof being beveled, and including means moving said fruit supporting means and said coring knife means relative to one another.

6. A spooning device for drupe fruit and the like as defined in claim 1, including a conveyor, said fruit supporting means and said knife means support being mounted on said conveyor and movable therewith, and cam means moving said coring knife means and said fruit supporting means relative to one another.

7. A spooning device for drupe fruit and the like as defined in claim 1, including a continuously moving conveyor, said fruit supporting means comprising at least one fruit receiving cup mounted upon and movable with said conveyor, said coring knife means comprising a coring knife for each cup, each coring knife being mounted upon and movable with said conveyor, and a cam moving said cups and coring knives relative to one another.

8. A spooning device for drupe fruit and the like as defined in claim 1, including a continuously moving conveyor, said fruit supporting means comprising at least one fruit receiving cup mounted upon and movable with said conveyor, said coring knife means comprising a hollow coring knife for each cup, the inner surface of each coring knife being beveled, each coring knife being mounted upon and movable with said conveyor, and a cam moving said cups and said coring knives relative to one another.

9. A spooning device for drupe fruit and the like as defined in claim 1, including a continuously moving conveyor, said fruit supporting means comprising at least one fruit receiving cup mounted upon and movable with said conveyor, said coring knife means comprising a coring knife for each cup, each coring knife being mounted upon and movable with said conveyor, a cam moving said cups and coring knives relative to one another, said ejecting means comprising a cam engaging said aligning device means at a predetermined point in the movement of said coring knives.

References Cited in the file of this patent
UNITED STATES PATENTS

| | | |
|---|---|---|
| 1,016,039 | Sawyer et al. | Jan. 30, 1912 |
| 1,766,824 | Jones | June 24, 1930 |
| 2,227,794 | Phillips | Jan. 7, 1941 |
| 2,246,843 | Drake | June 24, 1941 |
| 2,360,103 | Britten | Oct. 10, 1944 |
| 2,437,637 | Bridge | Mar. 9, 1948 |
| 2,506,802 | Magnuson et al. | May 9, 1950 |
| 2,646,830 | Lawrence | July 28, 1953 |
| 2,788,037 | Carter | Apr. 9, 1957 |